April 29, 1952 H. PINES 2,594,343
ALKYLATION OF ISOPARAFFINS
Filed Nov. 20, 1942
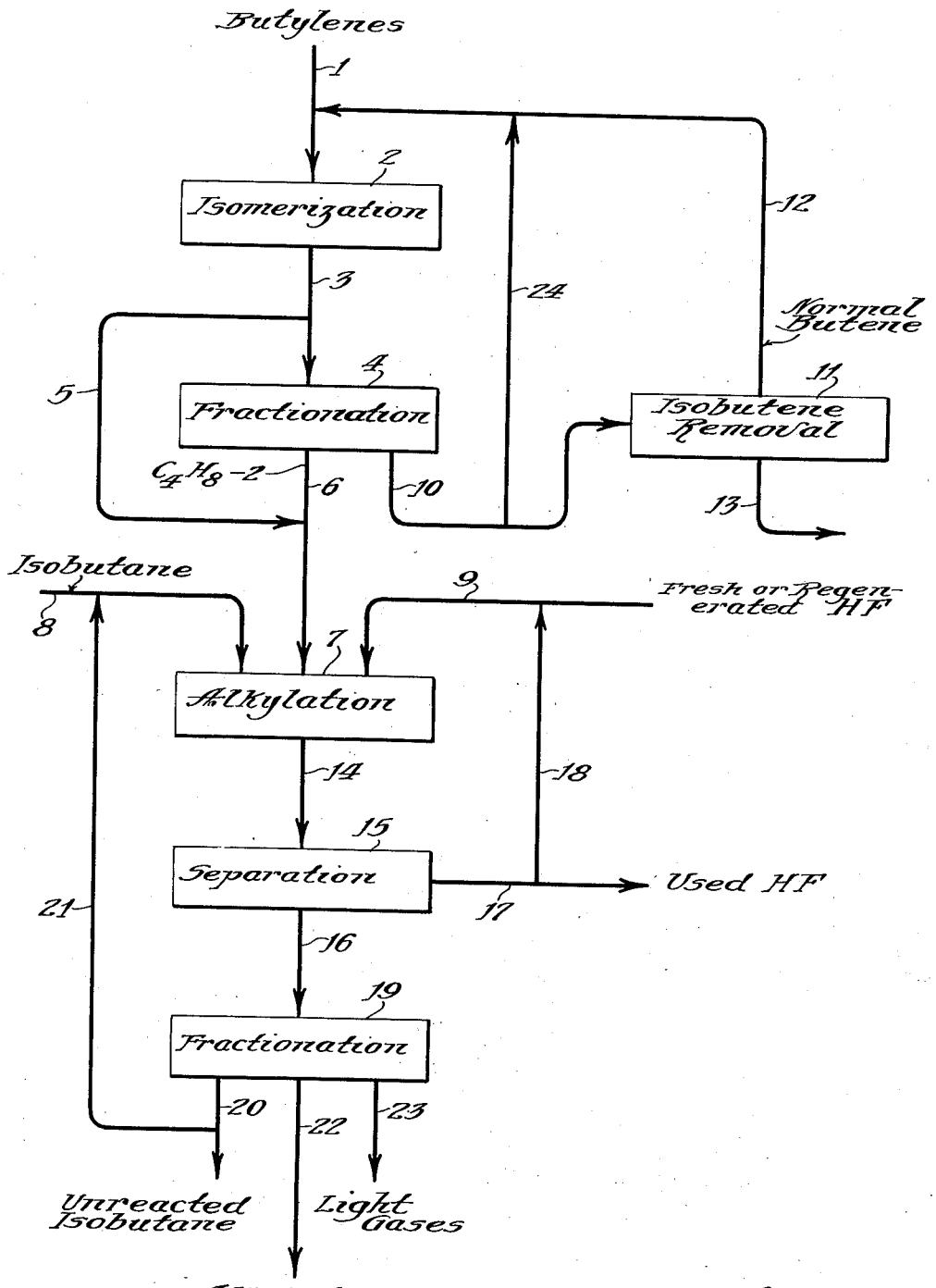
Inventor:
Herman Pines
By: Lee J. Gary
Attorney Patented Apr. 29, 1952

2,594,343

UNITED STATES PATENT OFFICE 2,594,343

ALKYLATION OF ISOPARAFFINS

Herman Pines, Riverside, Ill., assignor to Universal Oil Products Company, Chicago, Ill., a corporation of Delaware Application November 20, 1942, Serial No. 466,339

10 Claims. (Cl. 260—683.4)

This invention relates to an improved method for the production of substantially saturated branched-chain hydrocarbons by the alkylation of isoparaffins with olefins. It is more particularly concerned with a combination of steps whereby isobutane is alkylated with butenes to obtain hydrocarbon reaction products which are suitable for use as motor fuel and which have substantially improved antiknock characteristics as compared with the motor fuel produced according to methods taught by the prior art.

In one specific embodiment the present invention comprises an improvement in the alkylation of isobutane with butenes in the presence of an alkylation catalyst, particularly a hydrogen fluoride catalyst, said improvement comprising the step of subjecting said butenes to isomerizing conditions prior to said alkylation step whereby to effect substantial isomerization of butene-1 to butene-2.

The alkylation of isoparaffinic hydrocarbons with olefinic hydrocarbons in the presence of various condensing agents is a process which has assumed considerable importance as a method for the production of saturated hydrocarbons or hydrocarbon fractions which, because of their high octane number and high susceptibility to added tetra ethyl lead, are important constituents of aviation gasoline. Catalysts such as concentrated sulfuric acid, chlorosulfonic acid, fluorosulfonic acid, phosphoric acid, aluminum chloride, etc. have been proposed for effecting this reaction. All of the prior art catalysts, however, have certain disadvantages which are not inherent in the process when hydrogen fluoride is used as the effective catalyst component.

Hydrogen fluoride catalysts are in general more selective, and undesirable side reactions such as polymerization, oxidation, etc. are avoided to an appreciable extent even when operating at temperatures substantially higher than are feasible with other alkylation catalysts. Moreover, the use of a substantially higher operating temperature eliminates the necessity for expensive refrigeration equipment which is required, for example, in commercial alkylation units employing sulfuric acid as a catalyst. As the hydrogen fluoride catalyst becomes contaminated with continued use, it may be regenerated readily and returned to the process for reuse. For example, regeneration may be effected by a distillation step or series of steps wherein purified hydrogen fluoride is separated from water and organic contaminants of a polymer-like nature.

Although isoparaffins, generally including the normally liquid isoparaffins such as isopentane or isohexane, may be alkylated with either normally gaseous or normally liquid olefins using a hydrogen fluoride catalyst, one of the most important applications of the process is found in the alkylation of isobutane with normally gaseous olefins, particularly the butenes. Substantial amounts to isobutane and the butenes are readily available from stabilizer overhead streams, cracking plant gases, natural gas and gasoline sources, etc.

According to the process of this invention markedly different results are obtained when isobutane is alkylated with butene-1, butene-2, and isobutene particularly when using a hydrogen fluoride catalyst. Under similar operating conditions the alkylation reaction products obtained when isobutane is alkylated with either butene-2 or isobutene will have substantially higher octane numbers than the products obtained when butene-1 is employed as the olefinic reactant.

This effect will be evident from the following description of experimental results obtained with the three butenes. Three experiments were conducted using a 98 weight per cent hydrogen fluoride catalyst and a stirring autoclave as the reaction zone. In each run about 100 parts by weight of the hydrogen fluoride catalyst was introduced into the autoclave which was cooled in a bath of ice water. Stirring was begun and the liquid hydrocarbon charging stock was added over a period of 4 to 4.5 hours. When the addition of charging stock was complete, stirring was continued for an additional 30 minutes. The entire reaction mixture was then transferred to a copper flask cooled to −80° C. which contained 100 parts by weight of water to engage the hydrogen fluoride. This flask was connected to a trap cooled to −80° C., and towers containing soda-lime and calcium chloride were disposed between the flask and the trap. The flask was allowed to warm to room temperature and the remaining hydrocarbon liquid was washed and dried. The condensable gas was distilled under reflux to remove pentane and higher hydrocarbons which were then returned to the liquid product.

The following table of data contains the experimental results from three runs A, B, and C wherein isobutane was alkylated with butene-1, butene-2, and isobutene, respectively.

Table

| Run | A | B | C |
|---|---|---|---|
| Charge Stock, Mol Per Cent: | | | |
| isobutane | 77 | 76 | 78 |
| Butene-1 | 22 | 4 | 0 |
| Butene-2 | 1 | 20 | 0 |
| iso-butene | 0 | 0 | 22 |
| Conditions: | | | |
| Mol Ratio: isobutane/butenes | 3.3 | 3.2 | 3.5 |
| Vol. Ratio: HF/Hydrocarbon | 0.16 | 0.16 | 0.16 |
| Temperature, °C | 10 | 10 | 10 |
| Contact Times, Hours [1] | 5 | 5 | 5 |
| Charge, parts by Weight: | | | |
| Isobutane | 1,742 | 1,540 | 1,816 |
| Butenes | 498 | 460 | 494 |
| Total | 2,240 | 2,000 | 2,310 |
| Recovered, parts by weight: | | | |
| Liquid (C₄ free) | 940 | 919 | 953 |
| C₅+ | 29 | 15 | 22 |
| Normal Butane | 14 | 18 | 13 |
| Isobutane | 1,140 | 982 | 1,169 |
| Loss | 117 | 66 | 153 |
| Liquid Yield, (Weight per cent of butenes charged) | 194 | 203 | 197 |
| 300° F. E. P. Gasoline | 85 | 91 | 91 |
| ASTM Octane Number | 92.7 | 95.3 | 96.7 |
| Weight Per Cent Fluorine | .0086 | .0009 | .0001 |
| Per cent 2,2,4-Trimethylpentane in Total Alkylate | 38 | 42 | 58 |

[1] Time elapsed from beginning of addition of charging stock until product removed from reactor.

A comparison of these results indicates that the alkylate produced in Run A using butene-1 is definitely inferior as evidenced by the lower octane number of the aviation cut, the lower amount of "iso-octane" (2,2,4-trimethylpentane), and the substantially higher combined fluorine content. In Run B using butene-2 the yield and properties of the aviation fraction of the alkylate are considerably improved. In Run C using isobutene the octane number and fluorine content of the product are somewhat better than the results of Run B.

On the basis of this discovery, my invention comprises, subjecting the butene fraction to be charged to an isobutane-butene alkylation process to a preliminary isomerization step wherein substantial amounts of butene-1 are converted to butene-2. It may also be desirable, depending upon the alkylation catalyst and operating conditions, to convert a portion of the butene-1 to isobutene. Moreover, any butene-2 which is present in the butene charge may also be converted to isobutene. When hydrogen fluoride is employed as the catalyst, the important objective will be to reduce the butene-1 content of the butene fraction by converting this less desirable olefin to either of the other two isomers which, in accordance with my discovery, will produce alkylates of higher quality.

The accompanying drawing is a schematic flow diagram of one method of conducting my process although obviously it is not intended to limit the invention thereby.

A butene fraction containing appreciable quantities of butene-1 is introduced through line 1 to isomerization zone 2. This zone may contain any of the catalysts well-known in the prior art for the isomerization of olefins, e. g., the pyrophosphates of copper, mercury, zinc, magnesium, cobalt, iron or aluminum. Similarly, under proper conditions a so-called solid phosphoric acid catalyst comprising a calcined composite of an acid of phosphorus and a solid carrier may be employed. The operating conditions in the isomerization zone will depend to a large extent upon the particular catalyst employed. When using the metal pyrophosphate type catalysts the pressures will generally be of the order of 100 pounds per square inch or less and a temperature of from about 250 to about 450° C. will be employed. When using a solid phosphoric acid type catalyst, the conditions chosen will depend upon the particular isomerization reaction which is desired. For example, at temperatures of 250° C. and higher, a pressure of less than 5 atmospheres, and a contact time of less than 1 minute, normal butenes are converted to isobutene. However, at temperatures below 250° C. and with considerably longer contact times, the conversion of butene-1 to butene-2 is the predominant reaction.

The isomerized products from zone 2 pass through line 3 to fractionation zone 4. The higher boiling butene-2 passes through line 6 to alkylation zone 7. A lower boiling fraction containing butene-1 and isobutene, if present, may be passed through line 10 to an isobutene removal zone 11 wherein isobutene may be selectively removed by polymerization or absorption in sulfuric acid or by other suitable means. The removed isobutene is withdrawn through line 13 and the remaining butene-1 is recycled through line 12 and line 1 to isomerization zone 2. In certain cases depending upon the composition of the butene fraction charged through line 1 and dependent upon the conversion of normal butenes to isobutene in zone 2, a portion or all of the effluent reaction products from zone 2 may be passsed directly through line 5 to line 6 and thence into alkylation zone 7. In other cases where the conversion to isobutene in zone 2 is relatively slight or where the presence of appreciable amounts of isobutene in alkylation zone 1 can be tolerated, the lower boiling fraction from line 10 may be recycled through line 24 to zone 2.

Isobutane is introduced through line 8 into alkylation zone 7 which is preferably a mixing or agitation zone, and fresh or regenerated catalyst which in this illustration comprises hydrogen fluoride is introduced through line 9. The hydrocarbon-catalyst emulsion passes through line 14 to separation zone 15 which may conveniently comprise a settling zone. The lower used catalyst layer is withdrawn through line 17 to a suitable regeneration step not shown. A substantial portion of the used catalyst is preferably recycled to the alkylation zone through lines 18 and 9. The upper hydrocarbon reaction products layer is introduced by means of line 16 to fractionation zone 19 wherein desired alkylation products are separated from unconverted reactants and undesired products.

Unreacted isobutane is withdrawn through line 20 and preferably recycled through line 21 to the alkylation zone 7. Alkylate of the desired boiling range and usually containing substantial amounts of normal butane is withdrawn through line 22. Light hydrocarbon gases, e. g., propane, are withdrawn through line 23.

The hydrogen fluoride alkylation process as conducted in zone 7 is ordinarily carried out at a temperature of from about 0 to about 100° C., although in certain cases it may be desirable to exceed this range in either direction. The pressure in the alkylation zone is usually maintained sufficiently high to insure substantially liquid phase operation, e. g., from about 6 to about 12 atmospheres. The time factor in the process may be measured by the "space time" which is defined as the volume of liquid catalyst in the reaction zone divided by the feed rate of hydrocarbon reactants in volumes of liquid per minute. A space time of from about 5 to about 80 minutes will ordinarily be employed. As is well-known in the alkylation art, it is desirable to maintain a relatively large excess of isoparaffins over olefins in the combined feed to the alkylation zone. For example, the isoparaffin to olefin ratio may be from about 2:1 to about 10:1 or higher.

The term hydrogen fluoride catalyst as used throughout this specification and in the appended claims is intended to include any catalyst whose essential active ingredient is hydrogen fluoride. Thus the hydrogen fluoride catalyst may contain as much as from about 10 to about 15% water. Excessive dilution with water, however, results in a weakening of the alkylating activity of the catalyst. It is also within the scope of my invention to have present relatively minor amounts of promoters such as boron tri-fluoride.

Although the present invention has been described with particular emphasis on the alkylation of isoparaffins with butenes, the principles of the invention are equally applicable to other mono olefins, for example, pentenes, hexenes, or higher molecular weight olefins. In each case the principal objective is to effect migration of the double bond in the olefin molecule to a more centralized position. Thus in the case of pentenes, pentene-1 is isomerized to pentene-2, etc. In each case this type of isomerization may also be accompanied by an appreciable degree of skeletal isomerization whereby branched chain olefins are formed from normal or straight-chain olefins.

I claim as my invention:

1. In the alkylation of an isoparaffin with an olefinic fraction containing an olefin having a terminal double bond, the method which comprises catalytically treating said fraction at olefin isomerizing conditions to convert a substantial portion, at least, of said olefin into an olefin having a more centrally located double bond, commingling the thus treated olefinic fraction with said isoparaffin and a hydrogen fluoride catalyst, and subjecting the resultant mixture to alkylation at a temperature of from about 0° to about 100° C.

2. In the alkylation of an isoparaffin with a $C_4$ olefinic fraction containing butene-1, the method which comprises catalytically treating said fraction to convert a substantial portion, at least, of said butene-1 into butene-2 and isobutene, commingling the thus treated $C_4$ fraction with said isoparaffin and a hydrogen fluoride catalyst, and subjecting the resultant mixture to alkylation at a temperature of from about 0° to about 100° C.

3. In the alkylation of an isoparaffin with an olefinic fraction containing an olefin having a terminal double bond, the method which comprises contacting said fraction with a solid phosphoric acid catalyst under olefin isomerizing conditions to convert at least a portion of said olefin into an olefin having a more centrally located double bond, commingling the total hydrocarbon effluent of said contacting step with said isoparaffin and a hydrogen fluoride catalyst, and subjecting the resultant mixture to alkylation at a temperature of from about 0° to about 100° C.

4. The method as defined in claim 3 further characterized in that said olefinic fraction is a $C_4$ hydrocarbon mixture containing butene-1.

5. The process of producing motor fuel from isobutane and an olefinic fraction containing normal butenes, which comprises subjecting the olefinic fraction to the action of an olefin isomerizing catalyst at olefin isomerizing conditions to convert the normal butenes to isobutene and alkylating the isobutane with the resultant isobutene in the presence of concentrated hydrofluoric acid at a temperature of from about 0° to about 100° C.

6. In the production of motor fuel from isobutane and an olefinic fraction containing butene-1, the method which comprises subjecting the olefinic fraction to the action of an olefin isomerizing catalyst at olefin isomerizing conditions to convert a substantial portion, at least, of said butene-1 into butene-2, and alkylating the isobutane with the resultant butene-2 in the presence of concentrated hydrofluoric acid at a temperature of from about 0° to about 100° C.

7. The improved process of producing high octane motor fuel paraffins from an isoparaffin and a secondary 1-olefin, each having four to five carbon atoms per molecule, which comprises subjecting said 1-olefin to the isomerizing action of a catalyst capable of isomerizing said 1-olefin to the corresponding 2-olefin, alkylating said isoparaffin with the resulting isomerization effluent in the presence of substantially anhydrous hydrofluoric acid at a temperature of from about 0° to about 100° C., and isolating from the resulting alkylation mixture a motor fuel of high octane rating.

8. In the alkylation of an isoparaffin with an olefinic fraction containing a normal butene, the method which comprises subjecting said olefinic fraction to the action of an olefin isomerizing catalyst at olefin isomerizing conditions to convert a substantial portion, at least, of said normal butene to isobutene, commingling the resultant isobutene with said isoparaffin and a hydrogen fluoride catalyst, and subjecting the resultant mixture to alkylation at a temperature of from about 0° to about 100° C.

9. In the production of motor fuel from isobutane and an olefinic fraction containing butene-1, the method which comprises subjecting the olefinic fraction to the action of an olefin isomerizing catalyst at olefin isomerizing conditions to convert a substantial portion, at least, of said butene-1 into butene-2, fractionating the resultant isomerization effluent to separate butene-2 therefrom, and alkylating the isobutane with the separated butene-2 in the presence of concentrated hydrofluoric acid at a temperature of from about 0° to about 100° C.

10. In the production of motor fuel from isobutane and an olefinic fraction containing butene-1, the method which comprises subjecting the olefinic fraction to the action of an olefin isomerizing catalyst at olefin isomerizing conditions to convert a substantial portion, at least, of said butene-1 into butene-2, fractionating the resultant isomerization effluent to separate butene-2 from unconverted butene-1, returning the latter to the isomerizing step, and alkylating the isobutane with the separated butene-2 in the presence of concentrated hydrofluoric acid at a temperature of from about 0° to about 100° C.

HERMAN PINES.

REFERENCES CITED

The following references are of record in the file of this patent:

UNITED STATES PATENTS

| Number | Name | Date |
| --- | --- | --- |
| 2,180,374 | Stahly et al. | Nov. 21, 1939 |
| 2,199,132 | Hull | Apr. 30, 1940 |
| 2,199,133 | Marschner | Apr. 30, 1940 |
| 2,227,559 | Stevens et al. | Jan. 7, 1941 |
| 2,267,730 | Grosse et al. | Dec. 30, 1941 |

OTHER REFERENCES

Frost et al., Compt. Rend. Acad. Sci. U. R. S. S. (N. S.), 4 (1936), pages 373 to 376.